United States Patent [19]
Frantom et al.

[11] Patent Number: 5,513,572
[45] Date of Patent: May 7, 1996

[54] HYBRID INFLATOR

[75] Inventors: Richard Frantom, Richmond; Robert Kremer; Klaus Ocker, both of Fraser; Robert Bishop, Sterling Heights, all of Mich.

[73] Assignee: AlliedSignal Inc., Morristown, N.J.

[21] Appl. No.: 241,092

[22] Filed: May 9, 1994

[51] Int. Cl.⁶ ............................ C06D 5/00; B60R 21/26
[52] U.S. Cl. ...................... 102/531; 222/3.5; 280/737; 280/741; 422/164
[58] Field of Search ........................ 102/530, 531, 102/440; 280/736, 737, 740, 741; 222/3.5; 422/164–166

[56] References Cited

U.S. PATENT DOCUMENTS

| | | | |
|---|---|---|---|
| 3,269,310 | 8/1966 | Wismar | 102/530 |
| 3,690,695 | 9/1972 | Jones, Sr. | 102/531 |
| 3,806,153 | 4/1974 | Johnson | 280/741 |
| 3,966,226 | 6/1976 | Roth | 280/737 |
| 4,131,300 | 12/1978 | Radke et al. | 280/737 |
| 4,600,123 | 7/1986 | Gallraith | 102/530 |
| 5,016,914 | 5/1991 | Fargle et al. | 280/741 |
| 5,076,607 | 12/1991 | Woods et al. | 280/737 |
| 5,290,060 | 3/1994 | Smith | 280/737 |
| 5,301,979 | 4/1994 | Allard | 280/737 |
| 5,330,730 | 7/1994 | Brede et al. | 280/737 |
| 5,345,876 | 9/1994 | Rose et al. | 102/531 |
| 5,378,019 | 1/1995 | Ketterer et al. | 280/737 |
| 5,388,859 | 2/1995 | Fischer et al. | 280/737 |

*Primary Examiner*—Harold J. Tudor
*Attorney, Agent, or Firm*—Markell Seitzman

[57] ABSTRACT

An inflator (20) comprising: a pressure vessel (22) made of a thin walled steel tubing (24), sealed at one end by an end plate or cap (30). The other end of the pressure vessel sealed by a propellant housing (50). A plurality of axial bores (56a–d) exiting through an adjacent part (58) of the housing (50) and a face of the adjacent part of the housing includes a second counter bore (70) and a plurality of radial bores (72a–d) radially extend therefrom. A rupture disk assembly (100) having a central portion (102) forms a rupture disk extending into the second counter bore (70) and a radially extending outer portion (104) fitted generally flat against the face (60).

11 Claims, 2 Drawing Sheets

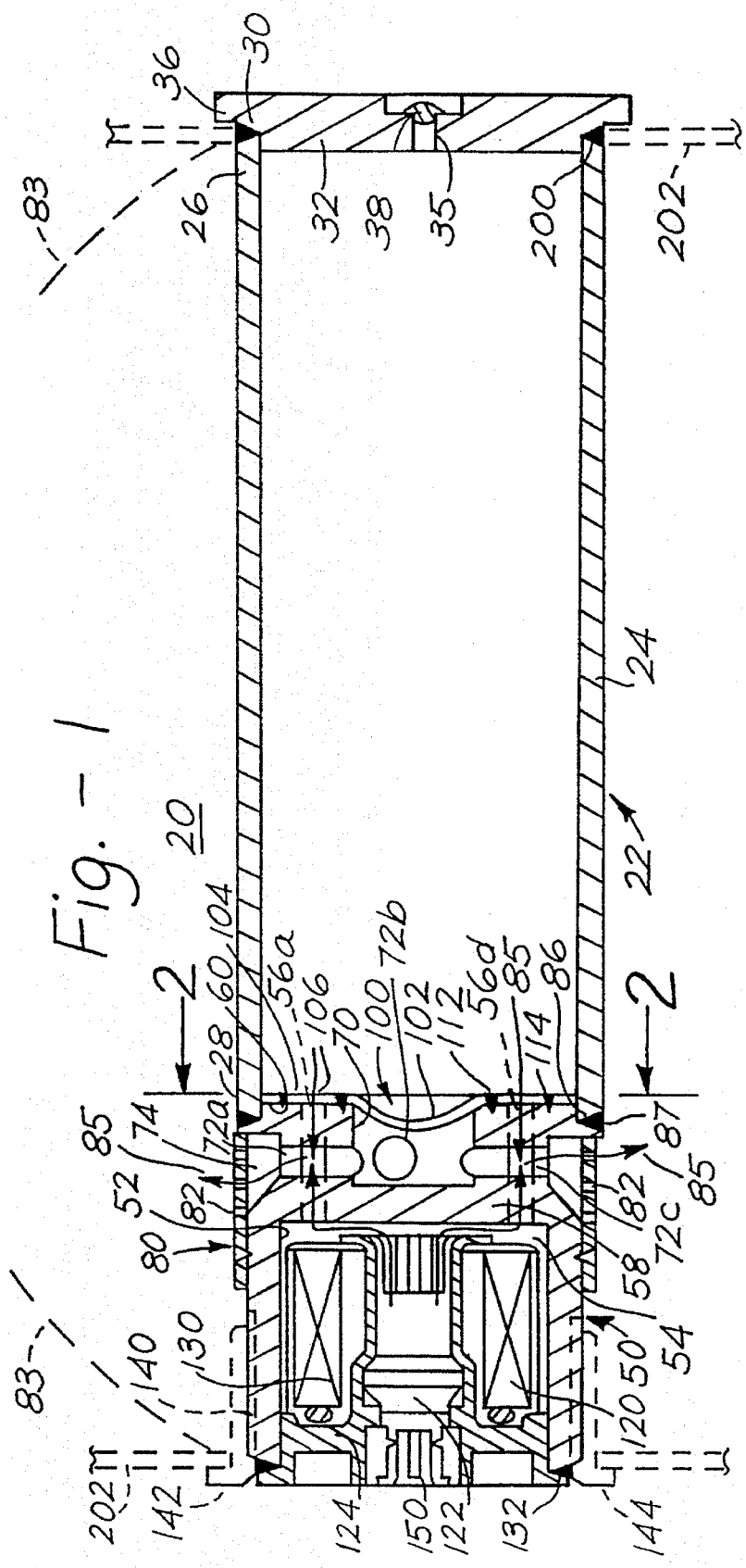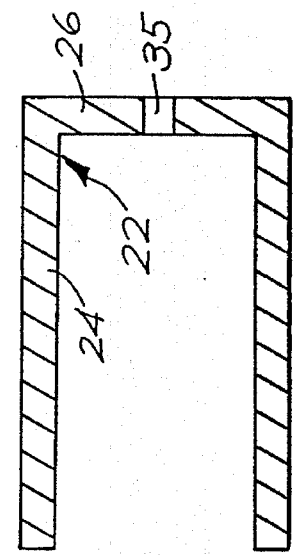

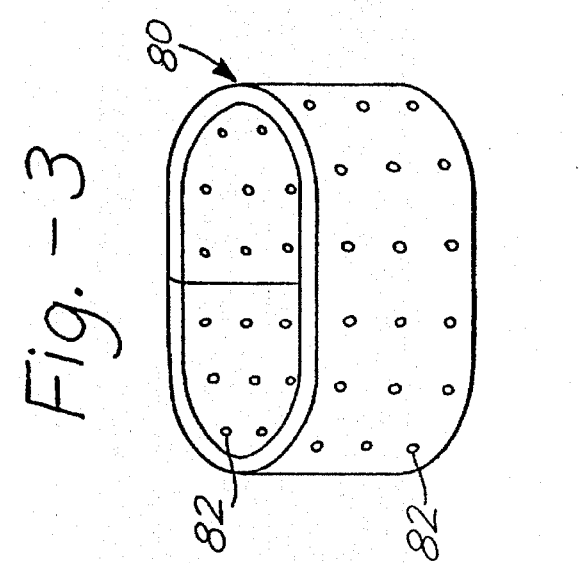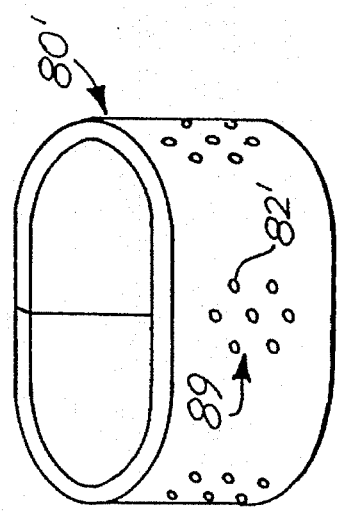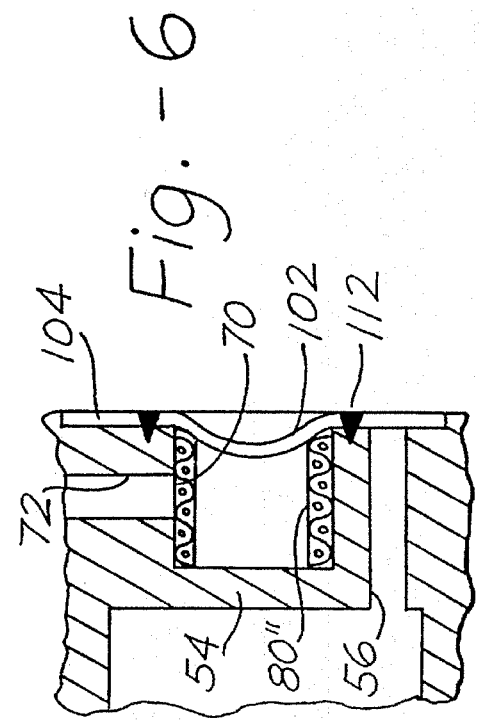

HYBRID INFLATOR

BACKGROUND AND SUMMARY OF INVENTION

The present invention generally relates to inflators for an air bag safety restraint system.

U.S. Pat. No. 5,076,607 shows a hybrid inflator having a sliding piston. This type of inflator permits an associated air bag to first be inflated during the initial moments of air bag inflation by the stored gas at ambient temperature and corresponding pressure, this is sometime referred to as a "cold gas" inflation. The inflation rate of the air bag is thereafter increased by heating the stored gas by the products of combustion of a burning propellant. While this inflator exhibits superior performance, its cost is relatively high and assembly complicated because of its moving parts.

It is an object of the present invention to provide an alternate hybrid inflator for air bag inflation having no moving parts. A further object of the present invention is to provide a low cost hybrid inflator having reduce assembly cost and time.

Accordingly the invention comprises: an inflator including a pressure vessel having a first and a second end, a propellant housing comprising pyrotechnic means for producing products of combustion, a combustion chamber to receive the products of combustion, at least one axial bore or passage extending therethrough to a face or wall thereof exposed to the pressure vessel, an inwardly directed first bore on the face, at least one radial bore or passage radially extending from the first bore to an exit opening or port through which inflation gas, previously stored in the pressure vessel may flow. The inflator additionally includes a multifunction rupture disk assembly having a central portion forming a rupture disk exposed to the first bore and a radially extending rupturable outer portion adjacent upon the face, first seal means about the rupture disk to secure disk to the propellant housing face, the outer portion also secured to the face by a second seal means radially outside the at least one axial passage or bore, the portion of the outer portion of the rupture disk assembly between the two seal means breakable in response to one of the products of combustion and pressure build-up in the pressure chamber communicated through the axial passage, the rupture disk breakable in response to the buildup of pressure in the pressure vessel, wherein upon breaking of the rupture disk inflation gas flows out of the pressure vessel through the at least one radial passage to the exit port. In one embodiment the exit port is achieved by use of a a common annular groove which cooperates with a perforated sleeve. The perforated cylindrical sleeve covers the annular groove and defines screen means for filtering solids in the inflation gas stream such as fragmented parts of the rupture disk resulting from functioning of the inflator. The propellant housing, includes a stepped shoulder adapted to fit into the second end of the pressure vessel. A seal is provided to yield a gas tight seal therebetween to inhibit escape of the inflation gas. The multi-function disk assembly has a central portion forming a rupture disk positioned over a bore and a radially extending outer portion fitted generally flat against the face, a circumferential seal is located on the outer portion, radially outside of the rupture disk to or secure of the central portion or burst portion to the propellant housing face. The outer portion is also secured to the face by a second circumferential seal radially outside of ends of the plurality of axial passages or bores. The portion of the outer portion, of the rupture disk assembly, covering the ends of the axial passages is breakable in response to the products of combustion and pressure build-up in the pressure chamber. The rupture disk also serves as a pressure relief device if the inflator is exposed to a heat source causing the internal pressure to increase. A propellant assembly is received within the first counter bore comprising an ignitor means for generating heat upon activation. A quantity of propellant is ignitable in response to burning of the ignitor means, the rate of the burning of the propellant is controlled in part by the pressure within the pressure chamber.

Many other objects and purposes of the invention will be clear from the following detailed description of the drawings.

BRIEF DESCRIPTION OF THE DRAWINGS

In the Drawings:

FIG. 1 illustrates an cross-sectional view of the present invention.

FIG. 2 illustrates a cross-sectional view through section line 2—2 of FIG. 1.

FIG. 3 illustrates a projected view of a sleeve.

FIG. 4 illustrates an alternate view of a sleeve.

FIG. 5 shows an alternate embodiment of the invention.

FIG. 6 shows another embodiment of the invention.

DETAILED DESCRIPTION OF THE DRAWINGS

With regard to FIGS. 1 and 2 there is shown a hybrid inflator 20 comprising a pressure vessel 22 made of a thin walled steel tubing 24. The pressure vessel or tubing has first and second ends 26 and 28 respectively. The first end 26 is enclosed by an end plate or cap 30 having a shoulder portion 32 received within the tubing 24 and extending flange 36. The plate or cap 30 is sealed such as by laser, TIG (tungsten inert gas) or friction welding to the tubing 24 to affect a gas tight seal therebetween. Typical of hybrid inflators the end cap includes a fill port 35. After filling the pressure vessel with argon 36 it is sealed by a weldable pallet 38. Alternatively, and as shown in FIG. 5 the pressure vessel 22 may be formed by a cold impact extrusion process. This construction eliminates one weld joint. As can be seen, the walls 24 are integral with the end cap 36.

The inflator further includes a propellant housing 50 which as described below seals the other end 28 of the pressure vessel. The propellant housing includes a first counter bore 52, the inside portion of which functions as combustion chamber 54. A plurality of axial bores or passages 56a–d extend through a part 58 of the housing 50. The axial passages extend from the counter bore 52 through to a face or a wall 60 facing the pressure vessel. The housing further includes a second counter bore 70 formed within the wall 60. A plurality of radially extending bores or passages 72a–d extend outwardly from the second counter bore and terminate at an angular groove 74 formed about the circumference of the part 58. The angular groove 74 is covered by a perforated cylindrical sleeve 80 that may be formed from a flat plate or extruded as a cylinder. The sleeve 80 is shown in greater detail in FIG. 3. The perforations 82 on the sleeve 80 define a screen to filter out solids in the inflation or exhaust gas (see arrow 85) including by products of the combustion process, debris and any small parts of a rupture disk prior to the entry into the air bag 83 shown on phantom line. In this embodiment the exhaust gas stream will exit the radial passages 72a–d and may be redirected circumferentially upon impact with the screen 80 thereby permitting the escaping inflation gas to exit from the inflator about the entire or larger portion of the circumference of the screen/ groove. FIG. 4 illustrates an alternative embodiment of the sleeve 80" wherein the perforations 82" are concentrated above corresponding one of the passages 72a–d forming discrete exit ports 89. In this manner the concentrated or clustered perforations 82' are centered about the passages 72a–d permitting the inflation gas to only exit the sleeve 80' at four defined locations as compared to the configuration of FIG. 3.

The propellant housing 50, in particular the portion 58, includes a stepped shoulder 86 adapt to fit within the second end 28 of the pressure vessel. A seal, such as a circumferential weld 87 provides a gas tight seal therebetween to inhibit the escape of inflation gas 36.

As can be seen from FIG. 2, the face or wall 60 includes four openings corresponding to the ends of the axial passages 56a–d and a fifth opening corresponding to the bore 70. These openings are enclosed by a multi-function disk assembly 100. The assembly comprises a central or inner portion 102 which forms a rupture disk and covers the second counter bore 70. In the position shown the rupture disk 102 is bowed outwardly due to the storage inflation gas which may be at a pressure of about 17,236 Kpa (2,500 psi) to 27,578K pa (4,000 psi). The multi-function assembly includes an outer or second portion 104 about the rupture disk. This second portion 104 is annular shaped and generally flat so that is may be laid against the flat face or wall 60 of the propellant housing. Prior to mounting the propellant housing 50 to the tubing 24, the rupture disk assembly is secured to the wall 60. More particularly, the rupture disk or central portion 102 is secured to the wall 60 by an optional circumferential seal 112. This seal may also typically be accomplish by a laser weld. The outer portion 104 of the rupture disk assembly is further secured to the face or wall 60 of the propellant housing by a second circumferential weld 114. As can be seen, the welds or seals 112 and 114 and define an annular ring portion 106 of the rupture disk assembly 100 about the ends of the axial passages 56a–d thereby blocking the ends of these passages. As will be seen below this annular ring is also rupturable.

Located in the propellant housing 50 is a propellant assembly 120 which is received within the counter bore 52. The propellant assembly comprises ignitor or squib 122 received within a carrier 124. Positioned about the ignitor 120 is an angularly shaped quantity of propellant material 130 such as Arcite. The carrier 124 is secured to the propellant housing 50 by a weld or other means of securement 132. The outer surface of the propellant housing 50 is threaded at 140 to receive a threaded nut 142. The nut 142 includes an extending flange 144. In this manner, the inflator 20 may be inserted within openings 200 in walls 202 of a housing. The flange 144 and a corresponding flange 36 of the end cap 30 provide a simple and reliable means of compressively loading the housing.

After assembly of the inflator 20, the quantity of stored, pressurized gas inserted into the pressure vessel 22 through the fill port 35 which is thereafter sealed at 38. As it is known in the art, associated electronic and sensing units function to sense the existence of a crash. Thereupon a control signal is communicated to the electric terminals 150 of the ignitor 120 to cause the ignitable 120 to burn. The burning of the ignitor causes the burning of the closely spaced propellant 130. As can be appreciated, the combustion chamber 54 during the initial moments of the burn is closed. As the propellant continues to burn, the pressure within the pressure chamber 54 continues to increase and the products of combustion of the burning propellant as well as pressure are communicated through the axial passages 56a–d.

The combustion chamber volume is sized to accommodate the amount of propellant needed to heat the inflation gas, typically 98% Argon and 2% Helium gas to a temperature which expands it to improve the efficiency of inflation. In driver side air bag systems, the required propellant weight is typically between 8 and 16 grams. The axial passages are sized to control the pressure in the chamber which in turn control the burn time of the propellant. Again, in a drive side inflator, a typical equivalent flow area of each of the passages 56a–d is about 2.5 mm. The radial passages tend to control the time required to reach peak pressure in the bag. If four radial passages 72 are used the flow area of each is about 3.5 mm. As mentioned, the effective area of the radial passages 56a–d is used, in part, to control the burn rate of the propellant 120. The burn rate is also controlled by the time it takes to break to outer part of the multi-function assembly. It should be appreciated that one or more of such passages, of suitable total area, may be used. One such passage 56 having an area of about 10.08 mm is shown in FIG. 6. Similarly one or more suitably sized axial passages may be used to communicate the exiting inflation gas to the air bag. As can be seen the optional annular groove 74 is not shown in FIG. 6. Additionally, the sleeve 80 is also not used and replaced by an internal screen 80" is inserted within the second bore 70.

As mentioned the products of combustion of the burning propellant flow through passages 56a–d and impinge upon the annular portion 106 of the multi-function disk assembly 100. If the inner weld or seal 112 is used at least a part of the annular portion 106 of the assembly 100 will rupture. Upon rupturing of the annular portion 106 of the multi-function disk assembly, by the products of combustion or increased pressure in the combustion chamber or both, the products of combustion are mixed with the stored, pressurized inflation gas within the pressure vessel. As the propellant continues to burn, the temperature as well as the pressure within the pressure vessel 22 increases to a level at which the inner or rupture disk portion 102 of the disk assembly 100 bursts, typically at about two times the nominal gas storage pressure or about 34,500 Kpa to about 55,000 Kpa depending upon the size of the pressure vessel. The now heated inflation gas flows through the second counter bore 70, the radial passages 72a–d and perforated screen 80 (or 80') to inflate a closely positioned air bag (not shown).

If the interior weld 112 is not used the multi-function disk assembly 100 may operate slightly differently. As can be appreciated by eliminating the weld 112 there is no longer an annular portion 106 situated between two welds. In this situation the products of combustion of the burning propellant will, as before, impinge on the assembly. These products of combustion may cause a local breaking of the assembly 100, at its outer part 104, with the rupture disk maintained generally in place by the pressurized inflation gas. Thereafter, the pressure in the pressure vessel will increase and cause the rupturing of the disk 102. Alternatively, the entire disk assembly may fracture or rupture in which case the inflation gas begins to flow immediately out of the pressure vessel and is heated by the products of combustion, or the outer part 104 may by lifted up to permit the products of combustion into the pressure vessel and the rupture disk 102 thereafter breaks due to the increased pressure vessel pressure.

Many changes and modifications in the above described embodiment of the invention can, of course, be carried out without departing from the scope thereof. Accordingly, that scope is intended to be limited only by the scope of the appended claims.

We claim:

1. An inflator (20) comprising:

a pressure vessel (22) made of a thin walled steel tubing (24), having a first (26) and a second (28) end, the first end closed by one of an end plate and cap (30) sealed thereto to provide a gas tight seal therebetween to inhibit inflation gas from within the pressure vessel, a propellant housing (50) comprising a first counter bore (52), which functions as a combustion chamber (54), a plurality of axial bores (56a–d) exiting through an adjacent part (58) of the housing (50) and intersecting a face (60) thereof, the face of the adjacent housing part including a second counter bore (70) remote from the axial bores, a plurality of radial bores (72a–d), remote from the axial bores, radially extending from the second counter bore (70) to an exit port, screen means (84), about the exit port, for filtering products of combustion produced upon use of the inflator, the propellant housing, at its adjacent housing part (58) including a stepped shoulder (86) fitted to the second end of the pressure vessel, a seal (87) is provided to yield a gas tight seal therebetween to inhibit escape of the inflation gas, a multi-function disk assembly (100) having a central portion (102) forming a rupture disk extending across the second counter bore (70) and a radially extending outer portion (104) fitted to the face (60), a circumferential seal (112) is located on the outer portion, radially outside of the rupture disk to secure the central portion to the propellant housing face (60), the outer portion also secured to the face by a second circumferential seal (114) radially outside of ends of the plurality of axial passages (56), the portion of the outer portion, of the multi-function assembly, covering the ends of the axial passages being breakable in response to the products of combustion, including pressure buildup in the chamber, a propellant assembly (120) received within the first counter bore (52) comprising an ignitor means (122) for generating heat upon activation, a quantity of propellant (130) ignitable in response to burning of the ignitor means, the rate of the burning of the propellant being controlled in part by the pressure within the pressure chamber (54), wherein the products of combustion in the pressure chamber are communicated through the axial passages to cause the breaking of the outer portion of the multi-function disk assembly to permit the products of combustion to enter the pressure vessel and heat the inflation gas stored therein, the rupture disk breakable in response to the buildup of pressure in the pressure vessel, wherein upon breaking of the rupture disk inflation gas flows out of the inflator through the radial passages exiting the inflator.

2. An inflator (20) comprising:

a pressure vessel (22) having a first (26) and a second (28) end, a propellant housing (50) comprising pyrotechnic means for producing products of combustion, a combustion chamber (54) to receive the products of combustion, at least one axial passage (56a–d) extending therethrough to a face (60) thereof exposed to the pressure vessel, an inwardly directed first (70) bore on the face, at least one radial passage (72a–d) radially extending from the first bore (70) to an exit opening through which inflation gas, stored in the pressure vessel flows, the first bore and the at least one radial passage remote from the at least one axial passage, a multi-function disk assembly (100) having a central portion (102) forming a rupture disk exposed to the first bore (70) and a radially extending rupturable outer portion (104) adjacent the face (60) covering the at least one axial bore, first seal means (114) for securing the assembly to the propellant housing face (60), the assembly breakable in response to one of the products of combustion and pressure build-up in the pressure chamber communicated through the axial passage, whereafter being broken inflation gas flows out of the pressure vessel through the at least one radial passage to the exit port.

3. The device as defined in claim 2 wherein the first seal means is located proximate the periphery of the multi-function disk assembly.

4. The device as defined in claim 3 including second seal means (112) located about the rupture disk, interior of the first seal means and interior an end of the at least one axial passage (56a–d) to secure the rupture disk to the face (60).

5. The device as defined in claim 2 wherein filter means, is located between the rupture disk and the exit port, for capturing solids in the exiting inflation gas.

6. The device as defined in claim 5 wherein the filter means includes a screen in the first bore.

7. The device as defined in claim 5 wherein the filter means includes a sleeve positioned about the exit port.

8. The device as defined in claim 2 including four axial passages.

9. The device as defined in claim 2 including four radial passages.

10. The device as defined in claim 9 wherein the radial passages terminate in an open groove.

11. The device as defined in claim 10 including a perforated sleeve covering the groove.

* * * * *